United States Patent [19]

Aoyagi et al.

[11] Patent Number: 5,753,324

[45] Date of Patent: May 19, 1998

[54] FIBER-REINFORCED COMPOSITE CYLINDRICAL FORM

[75] Inventors: Kenichi Aoyagi; Hiroshi Onoda; Hidetoshi Takagi; Tetsufumi Ikeda, all of Yokohama, Japan

[73] Assignee: Nippon Oil Co., Ltd., Tokyo, Japan

[21] Appl. No.: 456,353

[22] Filed: Jun. 1, 1995

[30] Foreign Application Priority Data

Jun. 6, 1994 [JP] Japan ................................ 6-145764

[51] Int. Cl.$^6$ .................................................. A47G 19/22
[52] U.S. Cl. .................... 428/34.6; 428/34.7; 428/35.7; 428/36.1; 428/36.2; 428/36.3; 428/107
[58] Field of Search .............................. 428/107, 34.6, 428/34.7, 35.7, 36.1, 36.2, 36.3

[56] References Cited

U.S. PATENT DOCUMENTS

| 4,248,062 | 2/1981 | McLain et al. |
| 4,463,044 | 7/1984 | McKinney ................................ 428/107 |
| 5,156,396 | 10/1992 | Akatsuka et al. |

FOREIGN PATENT DOCUMENTS

| 0517188 | 12/1992 | European Pat. Off. |
| 2909393 | 3/1981 | Germany. |
| 2276119 | 9/1994 | United Kingdom. |

OTHER PUBLICATIONS

Handbook of Industrial Materials, Elsevier Science Publishers, 1992 568–572.

Bohr Z. Jang, Advanced Polymer Composites, Principles and Applications, 1994, 7–13, 63,64,97.

Patent Abstracts of Japan,vol. 12 No. 267 (m–722),Jul. 26, 1988 & JP–A–63 049426 (Ryobi Ltd.) Mar. 2, 1988 *abstract;figure 1*.

Database WPI Week 9349Derwent Publications Ltd., London, GB; AN 93–392206 & JP–A–05 293 919 (Nippon Steel), Nov. 9, 1993 *abstract*.

Database WPI Week 9241 Derwent Publications Ltd., London, GB; AN 92–336118 & JP–A–04 240 221 (Toray Ind.) Aug. 27, 1992 *abstract*.

*Primary Examiner*—Richard Weisberger
*Attorney, Agent, or Firm*—Bucknam and Archer

[57] ABSTRACT

A fiber-reinforced composite cylindrical form formed by winding up unidirectional prepreg sheets around a mandrel according to such four patterns as to set the fiber winding angles of the resulting layers thereof at 0°, 90°, 40° to 50°, and −40° to −50° with the longer direction thereof, and then heat-curing said layers of said prepreg sheets.

9 Claims, No Drawings

FIBER-REINFORCED COMPOSITE CYLINDRICAL FORM

BACKGROUND OF THE INVENTION

1. Field of the Invention

The present invention relates to a fiber-reinforced composite cylindrical form.

2. Prior Art

In a cylindrical form produced according to a cylindrical form production method of laminating prepreg sheets in a number of layers wound up around a mandrel, hot-pressing the resulting laminate still wound around the mandrel, and then removing therefrom the mandrel (sheet rolling method), the fiber winding angles of the layers are generally 0° and 90° with respect to the longitudinal direction thereof. The fiber winding angle of 0° is set for the purpose of improving the flexural rigidity of the cylindrical form to decrease the deflection thereof, while the fiber winding angle of 90° is set for the purpose of maintaining the shape of the cylindrical form in such a way as to avoid the collapse thereof under pressure. Where the cylindrical form is used in a place wherein no sufficient span can be secured as compared with the outer diameter thereof, however, a rigidity as is expected from the modulus of elasticity of fibers cannot be secured to allow the cylindrical form to be largely deflected.

SUMMARY OF THE INVENTION

An object of the present invention is to provide a lightweight fiber-reinforced composite cylindrical form high in rigidity and hence little in deflection.

The inventors of the present invention have completed the present invention through contrivance of the fiber winding angles of the layers of a fiber-reinforced composite cylindrical form.

Specifically, the present invention provides a fiber-reinforced composite cylindrical form formed by winding up unidirectional prepreg sheets around a mandrel according to such four patterns as to set the fiber winding angles of the resulting layers thereof at 0°, 90°, 40° to 50°, and −40° to −50° with respect to the longitudinal direction thereof, and then heat-curing the layers of the prepreg sheets.

In the fiber-reinforced composite cylindrical form of the present invention, fiber layers respectively oriented at fiber winding angles of 40° to 50° and −40° to −50° with respect to the longitudinal direction thereof are incorporated at a given ratio in addition to fiber layers respectively oriented at fiber winding angles of 0° and 90° with respect to the longitudinal direction thereof to make the cylindrical form high in rigidity and hence of little deflection.

Herein, any reinforcing fibers can be used either alone or in mixture as reinforcing fibers for use in unidirectional prepreg sheets to be respectively oriented at fiber winding angles of 0°, 40° to 50° and −40° to −50° with respect to the longitudinal direction thereof in so far as they have a tensile modulus of elasticity of 400 to 900 GPa, preferably 550 to 900 GPa, further preferably 650 to 900 GPa, most preferably 750 to 900 GPa.

The tensile modulus of the reinforcing fibers oriented at the winding angles of 0°, 40° to 50° and −40° to −50° have an influence in particular on the deflection of a cylindrical molded product, so that the preferable magnitude of the tensile modulus of the reinforcing fibers can be suitably selected depending on the end-use of the cylindrical form. For example, if the cylindrical form is to be used in place of an aluminum cylindrical form, the tensile modulus ranging from 400 to 900 GPa may be required for the reinforcing fibers to be oriented at 0°, 40° to 50° whereas if the cylindrical form is to be used in place of a stainless steel cylindrical form, the tensile modulus in tension ranging from 750 to 900 GPa may be required for the reinforcing 0°, 40° to 50° and −40° to −50°.

Further, a reinforcing fiber having a compression strength of preferably 200 MPa or more preferably 300 MPa or more, still more preferably 400 MPa or more, most preferably 500 MPa or more, the upper limit thereof being 3000 MPa or less, is generally employed in the unidirectional prepreg sheets to be oriented at the fiber winding angles of 0°, 40° to 50° and −40° to −50°.

Examples of such reinforcing fibers to be oriented at 0°, 40° to 50° and −40° to −50° include a pitch-based carbon fiber, a PAN-based carbon fiber, a 5 boron fiber, an alumina fiber, a silicon carbide fiber, a beryllium fiber, and a tungsten fiber, among which the pitch-based carbon fiber is especially preferably used.

As for a reinforcing fiber for use in a unidirectional prepreg sheet to be oriented in the direction of 90° to the longitudinal direction, any kind of reinforcing fiber may be used individually or in combination, provided that the lower limit of compression strength of the reinforcing fiber to be used is 300 MPa or more, preferably 500 MPa or more, more preferably 1000 MPa or more, most preferably 1300 MPa or more, and the upper limit of compression strength thereof is 3000 MPa or less.

For the purpose of improving the compression strength of a cylindrical form, a reinforcing fiber of higher compression strength may preferably be employed in the unidirectional prepreg sheets to be oriented at the fiber winding angles of 90°.

It is preferable in general to use a reinforcing fiber having a tensile modulus in the 25 range of 50 to 900 GPa, preferably in the range of 100 to 900 GPa, more preferably in the range of 200 to 540 GPa in the unidirectional prepreg sheets to be oriented at the fiber winding angles of 90°.

The examples of such a reinforcing fiber to be oriented at 90° are pitch-based carbon fiber, PAN-based carbon fiber, boron fiber, alumina fiber, silicon carbide fiber, beryllium fiber, tungsten fiber, aramid fiber, and glass fiber. Among them, PAN-based carbon fiber, rayon fiber and pitch-based carbon fiber are more preferable, PAN-based carbon fiber being most preferable.

Further, a matrix resin that can be used in the unidirectional prepreg sheets may be any known matrix resin, preferred examples of which include thermosetting resins such as epoxy resins, phenolic resins, unsaturated polyester resins, and polyimide resins, among which the epoxy resins are especially preferred.

The unidirectional prepreg sheets are wound up layer by layer around a tapered mandrel or an untapered mandrel, especially preferably the untapered mandrel, while being oriented at given fiber winding angles with respect to the longitudinal direction thereof to produce a cylindrical form. The wind-up method is not particularly limited. Thus, the prepreg sheets may be manually wound up around the mandrel. Alternatively, the prepreg sheets may be wound up around the central roll (mandrel) of a three-roll wind-up machine. Further alternatively, the prepreg sheets may be wound up around the mandrel while using a rolling table.

The total number of the layers of the unidirectional prepreg sheets laminated on one another, though not particularly limited, is usually 5 to 200, preferably 8 to 70. The patterns of laminating the prepreg sheets at given fiber winding angles with respect to the longitudinal direction thereof, though not particularly limited, are especially preferably such that unidirectional prepreg sheets respectively oriented at fiber winding angles of 40° to 50° and −40° to −50° with respect to the longitudinal direction thereof are disposed adjacent to each other in order to secure a desired rigidity.

The thickness ratio of the layers of the unidirectional prepreg sheets laminated on one another and respectively oriented at the given fiber winding angles with respect to the longitudinal direction thereof, though not particularly limited, may especially be represented by such a percentage composition that the layer(s) oriented at a fiber winding angle of 0° accounts for 50 to 90%, the layer(s) oriented at a fiber winding angle of 90° for 5 to 35%, the layer(s) oriented at a fiber winding angle of 40° to 50° for 2 to 20%, and the layer(s) oriented at a fiber winding angle of −40° to −50° for 2 to 20%. In this case, a good rigidity can be secured for the resulting cylindrical form.

Further, in order to improve the working accuracy of the surface of the final cylindrical form, it is preferred that a cloth prepreg shoot having a thickness of 0.5 to 1 mm be further formed on the outermost layer (outside layer of a cylindrical form) of the unidirectional prepreg sheets, and then shaven by 0.2 to 0.9 mm. The employable weave of the cloth prepreg sheet is not particularly limited, examples of which include a plain weave, a satin weave, and a twill weave. There is no restriction as to the kind of cloth fiber. However, carbon fiber and glass fiber -for example are generally employed.

After the unidirectional prepreg sheets are wound up around the mandrel, a cellophane tape, a polypropylene resin tape or a polyester resin tape is wound up around the prepreg sheets, which are then heat-cured usually at 50° to 300° C., preferably at 70° to 200° C., for at least 1 minute, preferably for at least 1 hour, whereby the fiber-reinforced composite cylindrical form can be produced. Herein, the heat-curing of the prepreg sheets may be effected either under ordinary pressure or under a pressure of at most 100 kgf/cm$^2$ in an autoclave.

The total thickness, length and diameter of the fiber-reinforced composite cylindrical form are not particularly limited. However, the total thickness may usually be 0.5 to 50 mm, preferably 2 to 10 mm, the length may usually be 1 cm to 1.0 m, preferably 50 cm to 5 m, and the diameter may usually be 1 cm to 10 m, preferably 5 cm to 3 m.

The cylindrical form obtained according to the present invention may be either cylindrical in parallel or tapered. However, the present invention is especially suitable for production of an untapered cylindrical-in-parallel form.

The fiber-reinforced composite cylindrical form of the present invention is applicable to, for example, industrial rollers such as a guide roll of a printer, a rubber roll, a film-carrying roll, and a papermaking roll, which are required to have a light weight, a low inertia, a high rigidity, a low flexibility, a corrosion resistance, an abrasion resistance and a high forming processability; sling jigs and kite skeletons such as jigs for aircraft equipment and a sling shaft, which are required to have a light weight, a high rigidity, a tow deflection, high vibratory properties, an abrasion resistance and a high forming processability; sporting goods and leisure amusement goods such as an astronomical telescope, which are required to have a light weight, a high rigidity, a high modulus of elasticity, high twisting properties, high forming processability and a low thermal expansion coefficient; etc. It is especially preferably used as an industrial roller.

The bending test is performed as follows.

A cylindrical form made of a fiber-reinforced composite is allowed to be supported on two points spaced apart by a span of 1,700 mm, and 8 pieces of nylon sling (a belt-like cloth), each having a width of 200 mm, are hung side by side at an equal interval on a spanned portion of the cylindrical form excluding the portions near the both supported points, i.e., a zone of 50 mm as measured from each end. To each of these slings is suspended a weight which is equivalent to a load of 195N, thereby applying a uniformly distributed artificial load of 1560N in total to the cylindrical form. Then, the magnitude of displacement (mm) of the central portion (a point spaced 850 mm from each supporting point) of the spanned portion of cylindrical molded product is measured using an extensometer fixed to a testing device.

DESCRIPTION OF THE PREFERRED EMBODIMENTS

The following Examples will illustrate the present invention, but should not be constructed as limiting the scope of the invention.

Examples 1 to 6 and Comparative Examples 1 to 5
The shape of fiber-reinforced composite cylindrical forms as well as prepregs used therein are as follows.

outer diameter: φ100 mm inner diameter: φ88 mm (radial thickness: 5.9 to 6 mm)

entire length: 1,700 mm prepreg A: a unidirectional prepreg sheet produced by impregnating a pitch-based carbon fiber of 690 GPa in tensile modulus of elasticity (trade name: XN70, manufactured by Nippon oil Company, Ltd.) with an epoxy resin prepreg B: a unidirectional prepreg sheet produced by impregnating a PAN-based carbon fiber of 230 GPa in tensile modulus of elasticity (trade name: T300, manufactured by Toray Industries, Inc.) with an epoxy resin Further, every fiber-reinforced composite cylindrical form was subjected to a bending test under the following conditions to measure the amount (mm) of displacement of the central portion thereof.

span: 1,700 mm width of load: 1,600 mm load: 1,560 N

The sheet prepregs A and B produced by impregnating carbon fibers arranged in one direction with an epoxy resin were wound up layer by layer around the mandrel of a three-roll wind-up machine in such a way as to constitute layers respectively oriented at four carbon fiber winding angles of 0°, 90°, 45° and −45° with respect to the longitudinal direction thereof, or at two carbon fiber winding angles of 0° and 90° with respect to the longitudinal direction thereof to laminate 11 to 19 layers differing in thickness and angle of orientation. Herein, the prepreg A was used for layers oriented at fiber winding angles of 0°, 45° and −45°, while the prepreg B was used for layers oriented at a fiber winding angle of 90°. The laminating patterns in Examples 1 to 6 and Comparative Examples 1 to 5 are summarized in Tables 1 to 6.

After all prepreg sheets were wound up around the mandrel, they were taped using a stretched polypropylene resin tape (trade name: MIRAYPHANE, manufactured by Mitsubishi Rayon Co., Ltd.) in order to maintain the shape thereof, and then heat-cured in a heating oven under ordinary pressure at 130° C. for 1 hour, followed by removal of the polypropylene resin tape and the mandrel to produce a fiber-reinforced composite cylindrical form.

The results of the bending test for cylindrical forms obtained in the foregoing manner are summarized in Tables 1 to 6, from which it will be understandable that fiber-reinforced composite cylindrical forms of Examples 1 to 6 wherein the layers thereof were respectively oriented at fiber winding angles of 90°, 0°, 45° and −45° with the longer direction thereof had lower in deflection as compared with fiber-reinforced composite cylindrical forms of Comparative Examples 1 to 5 wherein the layers thereof were respectively oriented at fiber winding angles of 90° and 0° with the longer direction thereof.

TABLE 1

| | Example 1 | | | | Example 2 | | |
|---|---|---|---|---|---|---|---|
| Prepreg | | Thickness (mm) | Angle of Orientation (°) | Prepreg | | Thickness (mm) | Angle of Orientation (°) |
| outside | B | 0.25 | 90 | outside | B | 0.25 | 90 |
| | A | 0.9 | 0 | | A | 0.9 | 0 |
| | B | 0.25 | 90 | | B | 0.25 | 90 |
| | A | 0.9 | 0 | | A | 0.65 | 0 |
| | B | 0.25 | 90 | | A | 0.125 | −45 |
| | A | 0.65 | 0 | | A | 0.125 | 45 |
| | A | 0.125 | −45 | | B | 0.25 | 90 |
| | A | 0.125 | 45 | | A | 0.9 | 0 |
| | B | 0.25 | 90 | | B | 0.25 | 90 |
| | A | 0.9 | 0 | | A | 0.65 | 0 |
| | B | 0.25 | 90 | | A | 0.125 | −45 |
| | A | 0.9 | 0 | | A | 0.125 | 45 |
| inside | B | 0.25 | 90 | | B | 0.25 | 90 |
| | | | | | A | 0.9 | 0 |
| | | | | inside | B | 0.25 | 90 | total thickness 6 mm
thickness ratio of layers oriented at fiber winding angles (0°:90°:45°:−45°) = 4.25:1.5:0.125: 0.125
bending test results (mm) 0.25 total thickness 6 mm
thickness ratio of layers oriented at fiber winding angles (0°:90°:45°:−45°) = 4.0:1.5:0.25:0.25
bending test results (mm) 0.25

TABLE 2

| | Example 3 | | | | Example 4 | | |
|---|---|---|---|---|---|---|---|
| Prepreg | | Thickness (mm) | Angle of Orientation (°) | Prepreg | | Thickness (mm) | Angle of Orientation (°) |
| outside | B | 0.25 | 90 | outside | B | 0.25 | 90 |
| | A | 0.65 | 0 | | A | 0.65 | 0 |
| | A | 0.125 | −45 | | A | 0.125 | −45 |
| | A | 0.125 | 45 | | A | 0.125 | 45 |
| | B | 0.25 | 90 | | B | 0.25 | 90 |
| | A | 0.9 | 0 | | A | 0.65 | 0 |
| | B | 0.25 | 90 | | A | 0.125 | −45 |
| | A | 0.65 | 0 | | A | 0.125 | 45 |
| | A | 0.125 | −45 | | B | 0.25 | 90 |
| | A | 0.125 | 45 | | A | 0.9 | 0 |
| | B | 0.25 | 90 | | B | 0.25 | 90 |
| | A | 0.9 | 0 | | A | 0.65 | 0 |
| | B | 0.25 | 90 | | A | 0.125 | −45 |
| | A | 0.65 | 0 | | A | 0.125 | 45 |
| | A | 0.125 | −45 | | B | 0.25 | 90 |
| | A | 0.125 | 45 | | A | 0.65 | 0 |
| inside | B | 0.25 | 90 | | A | 0.125 | −45 |
| | | | | | A | 0.125 | 45 |
| | | | | inside | B | 0.25 | 90 | total thickness 6 mm
thickness ratio of layers oriented at fiber winding angles (0°:90°:45°:−45°) = 3.75:1.5:0.375:0.375
bending test results (mm) 0.24 total thickness 6 mm
thickness ratio of layers oriented at fiber winding angles (0°:90°:45°:−45°) = 3.5.:1.5:0.5:0.5
bending test results (mm) 0.25

TABLE 3

| | Example 5 | | | | Example 6 | | |
| --- | --- | --- | --- | --- | --- | --- | --- |
| | Prepreg | | Thickness (mm) | Angle of Orientation (°) | Prepreg | Thickness (mm) | Angle of Orientation (°) |
| outside | B | | 0.25 | 90 | outside B | 0.25 | 90 |
| | A | | 0.9 | 0 | A | 0.9 | 0 |
| | B | | 0.25 | 90 | A | 0.125 | −45 |
| | A | | 0.9 | 0 | A | 0.125 | 45 |
| | A | | 0.125 | −45 | A | 0.9 | 0 |
| | A | | 0.125 | 45 | A | 0.125 | −45 |
| | A | | 0.9 | 0 | A | 0.125 | 45 |
| | A | | 0.125 | −45 | A | 0.9 | 0 |
| | A | | 0.125 | 45 | A | 0.125 | −45 |
| | A | | 0.9 | 0 | A | 0.125 | 45 |
| | B | | 0.25 | 90 | A | 0.9 | 0 |
| | A | | 0.9 | 0 | A | 0.125 | −45 |
| inside | B | | 0.25 | 90 | A | 0.125 | 45 |
| | | | | | A | 0.9 | 0 |
| | | | | | inside B | 0.25 | 90 | total thickness 6 mm
thickness ratio of layers oriented at fiber winding angles (0°:90°:45°:−45°) = 4.5:1.0:0.25:0.25
bending test results (mm) 0.22 total thickness 6 mm
thickness ratio of layers oriented at fiber winding angles (0°:90°:45°:−45°) = 4.5:0.5:0.5:0.5
bending test results (mm) 0.21

TABLE 4

| | Comparative Example 1 | | | | Comparative Example 2 | | |
| --- | --- | --- | --- | --- | --- | --- | --- |
| | Prepreg | | Thickness (mm) | Angle of Orientation (°) | Prepreg | Thickness (mm) | Angle of Orientation (°) |
| outside | B | | 0.29 | 90 | outside B | 0.33 | 90 |
| | A | | 0.85 | 0 | A | 0.8 | 0 |
| | B | | 0.29 | 90 | B | 0.33 | 90 |
| | A | | 0.85 | 0 | A | 0.8 | 0 |
| | B | | 0.29 | 90 | B | 0.33 | 90 |
| | A | | 0.85 | 0 | A | 0.8 | 0 |
| | B | | 0.29 | 90 | B | 0.33 | 90 |
| | A | | 0.85 | 0 | A | 0.8 | 0 |
| | B | | 0.29 | 90 | B | 0.33 | 90 |
| | A | | 0.85 | 0 | A | 0.8 | 0 |
| inside | B | | 0.29 | 90 | inside B | 0.33 | 90 | total thickness 5.99 mm
thickness ratio of layers oriented at fiber winding angles (0°:90°) = 4.25:1.74
bending test results (mm) 0.32 total thickness 5.98 mm
thickness ratio of layers oriented at fiber winding angles (0°:90°) = 4.0:1.98
bending test results (mm) 0.33

TABLE 5

| | Comparative Example 3 | | | | Comparative Example 4 | | |
| --- | --- | --- | --- | --- | --- | --- | --- |
| | Prepreg | | Thickness (mm) | Angle of Orientation (°) | Prepreg | Thickness (mm) | Angle of Orientation (°) |
| outside | B | | 0.375 | 90 | outside B | 0.416 | 90 |
| | A | | 0.75 | 0 | A | 0.7 | 0 |
| | B | | 0.375 | 90 | B | 0.416 | 90 |
| | A | | 0.75 | 0 | A | 0.7 | 0 |
| | B | | 0.375 | 90 | B | 0.416 | 90 |
| | A | | 0.75 | 0 | A | 0.7 | 0 |
| | B | | 0.375 | 90 | B | 0.416 | 90 |
| | A | | 0.75 | 0 | A | 0.7 | 0 |
| | B | | 0.375 | 90 | B | 0.416 | 90 |
| | A | | 0.75 | 0 | A | 0.7 | 0 |
| inside | B | | 0.375 | 90 | inside B | 0.416 | 90 | total thickness 6 mm
thickness ratio of layers oriented at fiber winding angles (0°:90°) 3.75:2.25
bending test results (mm) 0.34 total thickness 5.996 mm
thickness ratio of layers oriented at fiber winding angles (0°:90°) = 3.5:2.496
bending test results (mm) 0.35

TABLE 6

| Comparative Example 5 | | | |
|---|---|---|---|
| Prepreg | | Thickness (mm) | Angle of Orientation (°) |
| outside | B | 0.25 | 90 |
| | A | 0.9 | 0 |
| | B | 0.25 | 90 |
| | A | 0.9 | 0 |
| | B | 0.25 | 90 |
| | A | 0.9 | 0 |
| | B | 0.25 | 90 |
| | A | 0.9 | 0 |
| | B | 0.25 | 90 |
| | A | 0.9 | 0 |
| inside | B | 0.25 | 90 | total thickness 6mm
thickness ratio of layers oriented at fiber
winding angles (0°:90°) = 4.5:1.5
bending test results (mm) 0.30

As described hereinbefore, the fiber-reinforced composite cylindrical form of the present invention is lightweight, high in rigidity, and of little deflection because the layers thereof are respectively oriented at four fiber winding angles of 0°, 90°, 40° to 50° and –40° to –50° with the longer direction thereof.

What is claimed is:

1. A fiber-reinforced composite untapered cylindrical form formed by winding up unidirectional prepreg sheets around an untapered mandrel so that the reinforcing fibers of said sheets are oriented at four winding angles of 0°, 90°, 40° to 50° and –40° to –50° with respect to the longitudinal direction of said cylindrical form to be prepared;

wherein 1) the sheets oriented at the four fiber winding angles respectively account for 50 to 90%, 5 to 35%, 2 to 20% and 2 to 20% of the total thickness of all said sheets 2) the fibers oriented at the three winding angles of 0°, 40° to 50° and –40° to –50° are carbon fibers having a tensile modulus ranging from 400 to 900 GPa, 3) the fibers oriented at the winding angle of 90° are PAN-based carbon fibers having a compression strength ranging from 300 to 3,000 MPa; further superimposing a cloth prepreg sheet 0.5 to 1 mm in thickness over the outermost layer of the unidirectional prepreg sheets and then heat-curing the thus wound and superimposed sheets.

2. The fiber-reinforced composite cylindrical form accord- ing to claim 1, wherein the reinforcing fibers oriented at the three winding angles of 0°, 40° to 50° and –40° to –50° have a compression strength ranging from 200 MPa to 3,000 MPa.

3. The fiber-reinforced composite cylindrical form according to claim 1, wherein the unidirectional prepreg sheets comprise a thermosetting resin as their matrix resin.

4. The fiber-reinforced composite cylindrical form according to claim 1 wherein said reinforcing fibers respectively oriented in the directions of 0°, 40° to 50° and –40° to –50° are pitch-based carbon fibers.

5. The fiber-reinforced composite cylindrical form according to claim 1 wherein said reinforcing fibers being oriented in the direction of 90° with respect to the longitudinal direction of the cylindrical form have a tensile modulus ranging from 50 to 900 GPa.

6. The fiber-reinforced composite cylindrical form according to claim 1 wherein said unidirectional prepreg sheets to be respectively oriented in the directions of 40° to 50° and –40° to –50° with respect to the longitudinal direction of said cylindrical form are disposed one upon another.

7. The fiber-reinforced composite cylindrical form according to claim 1 wherein said cloth prepreg sheet is woven in form of a plain weave, a satin weave or a twill weave.

8. The fiber-reinforced composite according to claim 1 wherein the total number of said unidirectional prepreg sheets is 5–200.

9. The fiber-reinforced composite according to claim 1 wherein a prepreg A is oriented at angles of 0°, 45° and –45° and a prepreg B is oriented at an angle of 90°.

* * * * *